United States Patent
Li et al.

(10) Patent No.: US 10,204,403 B2
(45) Date of Patent: Feb. 12, 2019

(54) METHOD, DEVICE AND MEDIUM FOR ENHANCING SATURATION

(71) Applicant: Xiaomi Inc., Haidian District, Beijing (CN)

(72) Inventors: Guosheng Li, Beijing (CN); Shanrong Liu, Beijing (CN); Jiangtao Huang, Beijing (CN)

(73) Assignee: XIAOMI INC., Haidian District, Beijing ( * ) Notice: Subject to any disclaimer, the term of this patent is extended or adjusted under 35 U.S.C. 154(b) by 0 days.

(21) Appl. No.: 15/489,746

(22) Filed: Apr. 18, 2017

(65) Prior Publication Data
US 2018/0018762 A1 Jan. 18, 2018

(30) Foreign Application Priority Data
Jul. 18, 2016 (CN) .......................... 2016 1 0566361

(51) Int. Cl.
| | |
|---|---|
| G06K 9/00 | (2006.01) |
| G06T 5/00 | (2006.01) |
| G09G 5/02 | (2006.01) |
| H04N 1/407 | (2006.01) |
| G06K 9/46 | (2006.01) |
| H04N 1/60 | (2006.01) |
| G06T 5/40 | (2006.01) |

(52) U.S. Cl.
CPC ............ *G06T 5/007* (2013.01); *G06K 9/4604* (2013.01); *G06K 9/4652* (2013.01); *G06T 5/40* (2013.01); *G09G 5/026* (2013.01); *H04N 1/4074* (2013.01); *H04N 1/6077* (2013.01); *G06T 2207/10024* (2013.01); *G09G 2320/0242* (2013.01); *G09G 2320/0613* (2013.01); *G09G 2340/06* (2013.01); *G09G 2340/14* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 6,791,711 B1 * | 9/2004 | Uekusa | H04N 1/6027 358/1.9 |
| 7,321,450 B2 * | 1/2008 | Uekusa | H04N 1/6027 358/2.1 |
| 8,891,861 B2 * | 11/2014 | Hua | G06F 17/3025 382/165 |
| 9,564,086 B2 * | 2/2017 | Ye | G09G 3/20 |
| 2008/0079750 A1 | 4/2008 | Setlur | |
| 2008/0226148 A1 * | 9/2008 | Gu | G06T 5/007 382/128 |

(Continued)

OTHER PUBLICATIONS

Extended European Search Report from EPO for EP application 17159901.

*Primary Examiner* — Soo Jin Park
(74) *Attorney, Agent, or Firm* — Jun He Law Offices P.C.; James J. Zhu

(57) ABSTRACT

A method, device and medium for enhancing saturation are provided. The method includes: obtaining image feature information of an image; identifying a type of the image according to the image feature information; selecting a saturation enhancement mode corresponding to the type of the image, and enhancing the saturation of the image using the saturation enhancement mode.

18 Claims, 6 Drawing Sheets

(56) References Cited

U.S. PATENT DOCUMENTS

| | | | |
|---|---|---|---|
| 2008/0317358 A1* | 12/2008 | Bressan | G06K 9/00456 382/224 |
| 2014/0241629 A1* | 8/2014 | Lerios | G06T 9/00 382/166 |
| 2015/0125090 A1 | 5/2015 | Mizobuchi et al. | |
| 2017/0091576 A1* | 3/2017 | Lerios | G06K 9/4652 |
| 2017/0140250 A1* | 5/2017 | Maloney | G06K 9/6267 |
| 2017/0142452 A1* | 5/2017 | Bae | H04N 21/234 |
| 2017/0243338 A1* | 8/2017 | Li | G06T 5/002 |
| 2017/0301310 A1* | 10/2017 | Bonnier | G09G 5/04 |

* cited by examiner

METHOD, DEVICE AND MEDIUM FOR ENHANCING SATURATION

CROSS REFERENCE TO RELATED APPLICATION

This application is based upon and claims priority to Chinese Patent Application Serial No. 201610566361.1, filed with the State Intellectual Property Office of P. R. China on Jul. 18, 2016, the entire contents of which are incorporated herein by reference.

TECHNICAL FIELD

The present disclosure relates to display technology field, and more particularly, to a method, device and medium for enhancing saturation.

BACKGROUND

Saturation is a degree of the brightness of color, also known as the purity of color. The saturation depends on a proportion of colorful components and achromatic components in the color. The more the colorful components are, the larger the saturation is, and the more the achromatic components are, the smaller the saturation is.

There are typical methods for enhancing saturation, which can enhance the colorfulness of an image. After the methods for enhancing saturation are applied to each image frame displayed in a terminal, it is possible to enhance display effect of the terminal.

SUMMARY

According to embodiments of the present disclosure, a method for enhancing saturation is provided. The method includes: obtaining image feature information of an image; identifying a type of the image according to the image feature information; selecting a saturation enhancement mode corresponding to the type of the image, and enhancing the saturation of the image using the saturation enhancement mode.

According to embodiments of the present disclosure, a device for enhancing saturation is provided. The device includes: a processor; a memory for storing instructions executable by the processor; in which the processor is configured to: obtain image feature information of an image; identify a type of the image according to the image feature information; select a saturation enhancement mode corresponding to the type of the image, and enhance the saturation of the image using the saturation enhancement mode.

According to embodiments of the present disclosure, there is provided a non-transitory computer-readable storage medium having stored therein instructions that, when executed by a processor of a device, causes the device to perform a method for enhancing saturation, the method including: obtaining image feature information of an image; identifying a type of the image according to the image feature information; selecting a saturation enhancement mode corresponding to the type of the image, and enhancing the saturation of the image using the saturation enhancement mode.

It is to be understood that both the foregoing general description and the following detailed description are exemplary and explanatory only and are not restrictive of the present disclosure.

BRIEF DESCRIPTION OF THE DRAWINGS

Accompanying drawings herein are incorporated in and constitute a part of the specification, and illustrate exemplary embodiments in line with the present disclosure, and serve to explain the principle of the present disclosure together with the description.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Typically, a same mode for enhancing saturation is usually used for each image frame displayed in a terminal. However, not all images are suitable for enhancing saturation. For instance, user interface (UI for short) images are artificially designed, whose original color is very vivid already. It will reduce beauty degree of the UI images if the saturation of the UI images is enhanced greatly. Therefore, the present disclosure provides exemplary embodiments as follows.

Figure 1:
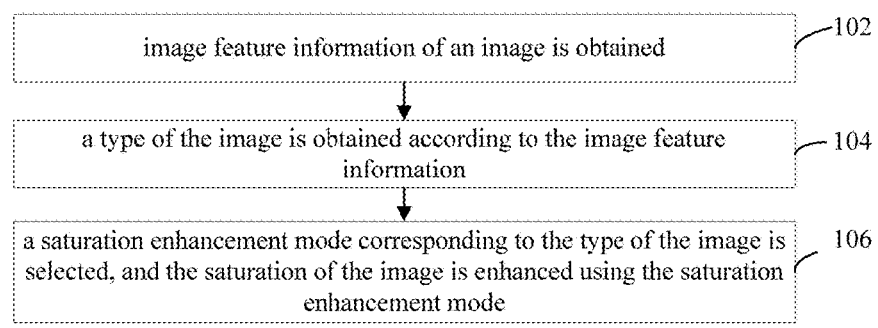
FIG. 1 is a flow chart showing a method for enhancing saturation according to an exemplary embodiment of the present disclosure.

FIG. 1 is a flow chart showing a method for enhancing saturation according to an exemplary embodiment of the present disclosure. It is exemplified that the method is applied to a terminal with image processing ability in this embodiment. The method includes followings.

In step 102, image feature information of an image is obtained.

In step 104, a type of the image is identified according to the image feature information.

In step 106, a saturation enhancement mode corresponding to the type of the image is selected, and the saturation of the image is enhanced using the saturation enhancement mode.

In summary, with the method for enhancing saturation provided by the embodiment, by identifying the type of the image according to the image feature information, selecting the saturation enhancement mode corresponding to the type of the image, and enhancing the saturation of the image using the saturation enhancement mode, it avoids that beauty degree of the UI image may be reduced when each image frame in a terminal is enhanced by the same mode for enhancing saturation. Thus, for each image frame of the terminal, different modes for enhancing saturation are used for different types, images of each type may get a better saturation, thus improving display effect of the terminal as a whole.

The type of the image includes: a nature image and a UI image. The nature image refers to an image produced according to an object that naturally exists, or an image generated by simulating an object that naturally exists. Common nature images include: an image obtained by a camera, an image frame obtained after decoding a video, an image frame in the simulated world which are rendered in real time by a game rendering engine, etc. The UI image is an image configured for human-machine interaction. The UI image is obtained by artificial design.

There is different image feature information between the nature image and the UI image. Taking the image in a color format of Red Green Blue (RGB for short) as an example, an image frame includes pixels distributed in X rows and Y columns, that is, X*Y pixels in total. Each pixel includes three color channels: a red channel R, a green channel G and a blue channel B. For a pixel, each color channel has a color gradation value, with a range of [0,255]. For instance, color gradation values corresponding to the three color channels of a pixel are (255, 0, 0), that is, the color gradation value corresponding to the red channel of the pixel is 255, the color gradation value corresponding to the green channel of the pixel is 0, and the color gradation value corresponding to the blue channel of the pixel is 0.

It should be noted that, the color gradation value may also be known as a brightness value, a gray value, a channel value or other names. It is taken as an example that the color channel includes three channels in embodiments of the present disclosure, but is not limited to this. An image may have four or more color channels when the image is in the different color formats.

Figure 2A:
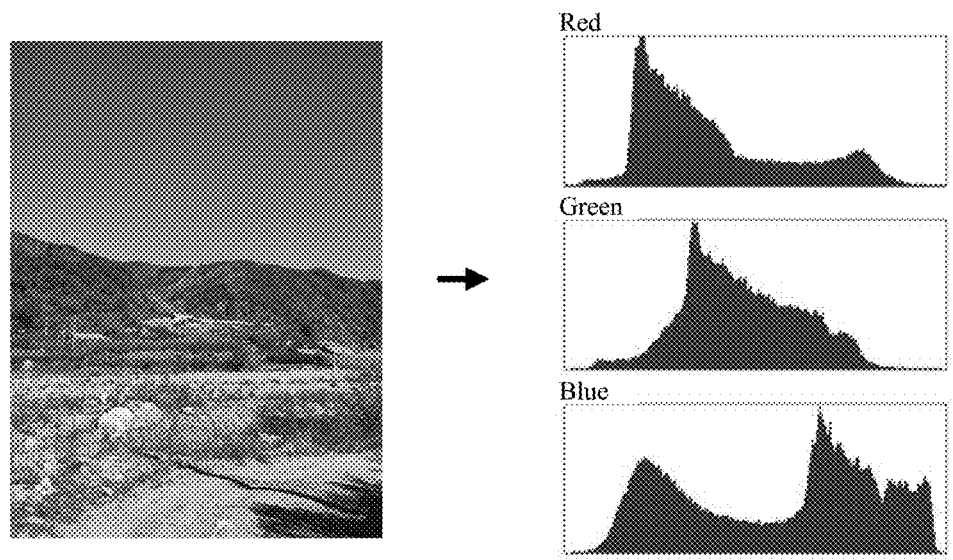
FIG. 2A is a schematic diagram illustrating a natural image and a "color gradation value-pixel number" histogram of the nature image according to an exemplary embodiment of the present disclosure.

FIG. 2A shows a natural image and a "color gradation value—the number of pixels" histogram of the nature image in the three color channels. The nature image is an outdoor landscape and the histogram shows a pixel distribution corresponding relationship of the nature image in graphical form. The pixel distribution corresponding relationship includes a corresponding relationship between a color gradation value and the number of pixels having the color gradation value. In the histogram, the abscissa represents the color gradation value, and the ordinate represents the pixel number of pixels with the color gradation value in the image. Ordinarily, a range of the color gradation value is [0, 255].

For instance, for the red channel of the nature image, the number of pixels corresponding to a color gradation value 0 is 1, the number of pixels corresponding to a color gradation value 1 is 2, the number of pixels corresponding to a color gradation value 2 is 2, the number of pixels corresponding to a color gradation value 3 is 5, . . . , the number of pixels corresponding to a color gradation value 67 is 130, . . . , the number of pixels corresponding to a color gradation value 255 is 0.

For the green channel of the nature image, the number of pixels corresponding to a color gradation value 0 is 0, the number of pixels corresponding to a color gradation value 1 is 0, the number of pixels corresponding to a color gradation value 2 is 1, the number of pixels corresponding to a color gradation value 3 is 5, . . . , the number of pixels corresponding to a color gradation value 102 is 130, . . . , the number of pixels corresponding to a color gradation value 255 is 0.

For the blue channel of the nature image, the number of pixels corresponding to a color gradation value 0 is 0, . . . , the number of pixels corresponding to a color gradation value 24 is 50, the number of pixels corresponding to a color gradation value 25 is 52, the number of pixels corresponding to a color gradation value 26 is 56, . . . , the number of pixels corresponding to a color gradation value 255 is 1.

It may be seen from the histogram that a change trend of the number of pixels respectively corresponding to adjacent color gradation values is a gradual trend, that is, the change trend meets the characteristics of the normal distribution, and a sudden change may not happen. The pixel number corresponding to each color gradation value has randomness and decentralization. For instance, a radio of the number of pixels respectively corresponding to adjacent color gradation values is 0.9907635, which is hard to be divided.

Figure 2B:
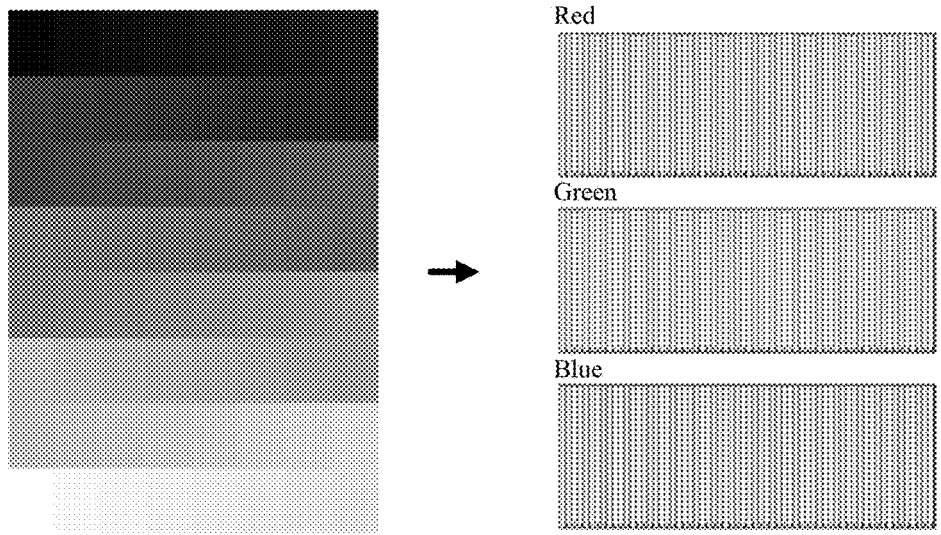
FIG. 2B is a schematic diagram illustrating a UI image and a "color gradation value-pixel number" histogram of the UI image according to an exemplary embodiment of the present disclosure.

FIG. 2B shows a UI image and a "color gradation value—the number of pixels" histogram of the UI image in the three color channels. The UI image includes a variety of color squares that vary according to the gradual change. The pixel number corresponding to each color gradation value distributes periodically in the corresponding histogram. A larger value (the vertical line shown in FIG. 2B) appears for every X color gradation values.

Figure 2C:
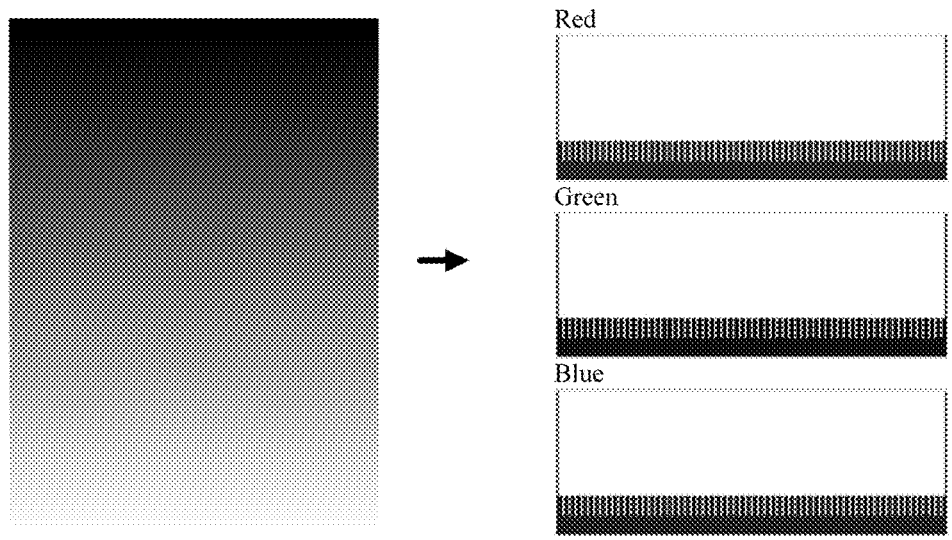
FIG. 2C is a schematic diagram illustrating a UI image and a "color gradation value-pixel number" histogram of the UI image according to another exemplary embodiment of the present disclosure.

FIG. 2C shows a UI image and a "color gradation value—the number of pixels" histogram of the UI image in the three color channels. The UI image includes color bands that vary according to the gradual change. The pixel number corresponding to each color gradation value distributes periodically in the corresponding histogram. The number of pixels corresponding to one part of color gradation values are Y, and the number of pixels corresponding to another part of color gradation values are 2Y. The two parts of color gradation values alternately and periodically appear in the abscissa.

Figure 2D:
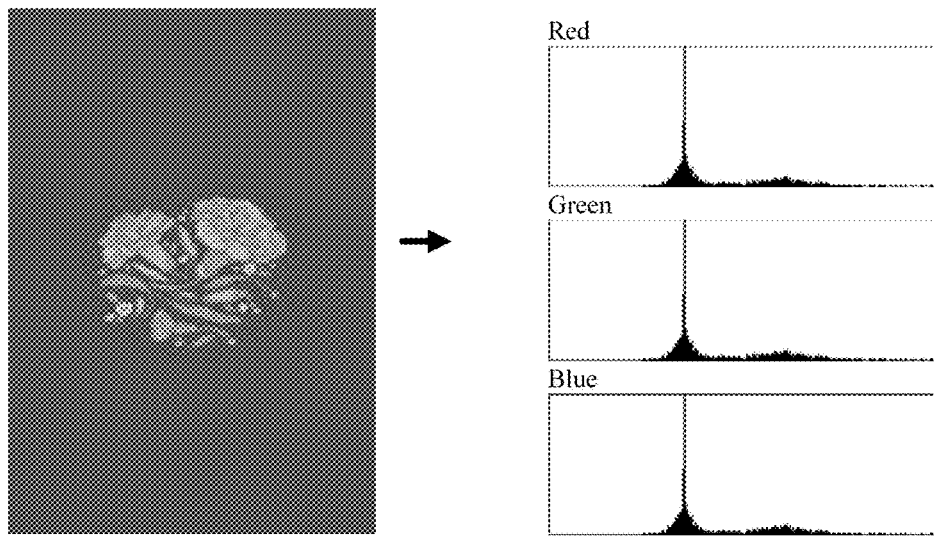
FIG. 2D is a schematic diagram illustrating a UI image and a "color gradation value-pixel number" histogram of the UI image according to another exemplary embodiment of the present disclosure.

FIG. 2D shows a UI image and a "color gradation value—the number of pixels" histogram of the UI image in the three color channels. The UI image includes a monochrome background and a flower pattern in the central part. As the color gradation value of each pixel in the monochrome background is the same completely, so in the corresponding histogram, most of the color gradation values are 0 or no larger than 50. Only a small part of the color gradation values located at the middle on the left get a larger value. Relative to the number of pixels corresponding to the color gradation values of the two adjacent sides of the middle on the left, the number of pixels corresponding to the small part of the color gradation values show a sudden change feature, suddenly changing from a large value to a small value, in which the small value is a value in (0, 50).

It may be seen from FIG. 2B to FIG. 2D that, as the UI image is artificially designed, in which a monochrome background, a combination design of several basic colors, or a pattern designed regularly is usually used, so in the histogram of the UI image, the number of pixels corresponding to adjacent color gradation values have the sudden change feature, or regular features may appear in some dimensions for the color gradation values, the number of pixels corresponding to certain color gradation values, or color gradation values of some pixels in each color channel.

In the following embodiments shown in FIG. 3 to FIG. 5, it is expatiated in detail how to identify the type of the image in the step 104, in which the sudden change feature is used to identify the type in embodiments shown in FIG. 3, the regular feature is used to identify the type in embodiments shown in FIG. 4, and the sudden change feature and the regular features are used to identify the type in embodiments shown in FIG. 5.

Figure 3:
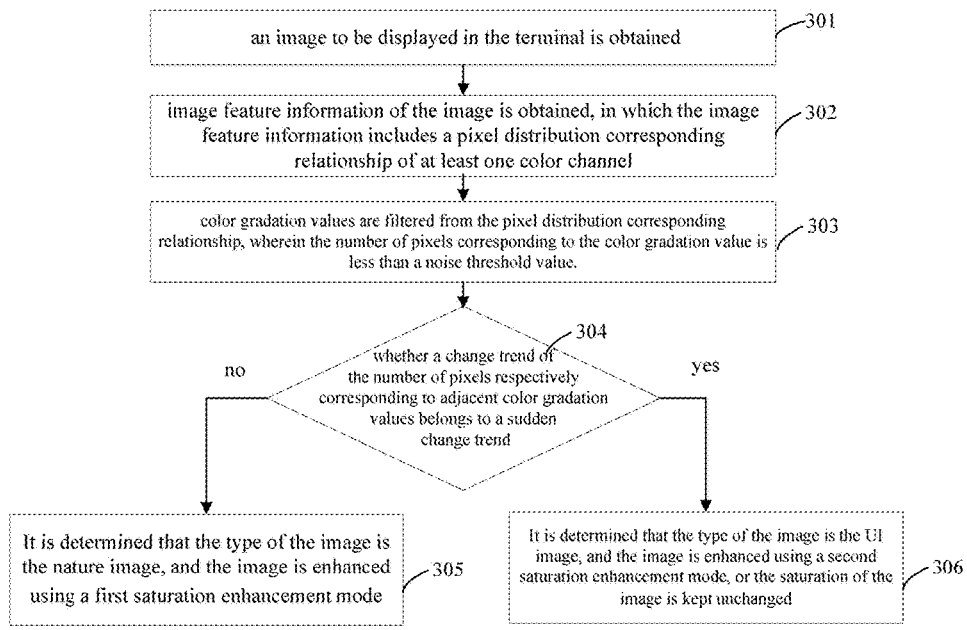
FIG. 3 is a flow chart showing a method for enhancing saturation according to another exemplary embodiment of the present disclosure.

FIG. 3 is a flow chart showing a method for enhancing saturation according to another exemplary embodiment of the present disclosure. It is exemplified that the method is applied to a terminal having image processing ability in this embodiment. The method includes followings.

In step 301, an image to be displayed in the terminal is obtained.

Images to be displayed are generated frame-by-frame during normal operation of the terminal. Alternatively, the images are UI images generated by an operating system of the terminal, UI images generated by an application, nature images played by a video player, nature images generated by a game program, or photos taken by a camera program etc.

The terminal reads these images as images to be processed.

In step 302, image feature information of the image is obtained, in which the image feature information includes a pixel distribution corresponding relationship of at least one color channel.

In some embodiments, the pixel distribution corresponding relationship includes a corresponding relationship between a color gradation value and the number of pixels having the color gradation value, that is, the corresponding relationship shown in FIG. 2A to FIG. 2D.

Upon obtaining the image data, the terminal obtains the pixel distribution corresponding relationship of at least one color channel as the image feature information of the image by computing the image data.

In some embodiments, the terminal computes a pixel distribution corresponding relationship of one color channel, the terminal computes pixel distribution corresponding relationships of two color channels. Alternatively, the terminal computes pixel distribution corresponding relationships of all color channels, which shall be determined by computing ability, computing speed, real-time requirements or other factors.

In step 303, color gradation values are filtered from the pixel distribution corresponding relationship, and the number of pixels corresponding to the color gradation values to be filed is less than a noise threshold value.

Since there are some color gradation values and the number of pixels corresponding to these color gradation values is very small, which belongs to meaningless noise, thus, the terminal filters these color gradation values. The "filter" refers to that these color gradation values are removed, or, when the pixel number corresponding to a color gradation value is less than the noise threshold value, the pixel number corresponding to the color gradation value may be set to 0.

The noise threshold value is a numerical threshold, for example, the noise threshold value is 60. Alternatively, the noise threshold value is a proportional threshold, such as one in ten thousand of total the number of pixels.

In step 304, it is detected whether a change trend of the number of pixels respectively corresponding to adjacent color gradation values belongs to a sudden change trend.

In some embodiments, the sudden change trend includes: there are $n_1$ groups of adjacent color gradation values, in which in each group of the $n_1$ groups of adjacent color gradation values, the difference between the number of pixels respectively corresponding to the adjacent color gradation values is greater than a first threshold value, and $n_1$ is a positive integer. Alternatively, the sudden change trend includes: there are $n_2$ groups of adjacent color gradation values, in which in each of the n2 groups of adjacent color gradation values, the ratio between the number of pixels respectively corresponding to the adjacent color gradation values is greater than a second threshold value, and n2 is a positive integer.

The adjacent color gradation values refer to the $i^{th}$ color gradation value and the $(i+k)^{th}$ color gradation value, in which i is an integer, and k is a preset value. For example, if k is 1, the first color gradation value and the second color gradation value are adjacent color gradation values, and the $102^{th}$ color gradation value and the $103^{th}$ color gradation value are adjacent color gradation values. For another example, if k is 2, the first color gradation value and the third color gradation value are adjacent color gradation values, and the $99^{th}$ color gradation value and the $101^{th}$ color gradation value are adjacent color gradation values. Alternatively, the value of k is predefined by a developer.

The terminal may detect whether a change trend of the number of pixels corresponding to n groups of adjacent color gradation values belongs to a sudden change trend. Alternatively, the terminal detects all the adjacent color gradation values, or the terminal detects a group of adjacent color gradation values every the preset number.

If the change trend does not belong to the sudden change trend, the type of the image is a nature image, and the method proceeds to the step 305. If the change trend belongs to the sudden change trend, the type of the image is a UI image, and the method proceeds to the step 306.

For example, when there are 4 groups of adjacent color gradation values, the difference between the number of pixels corresponding to each of which is larger than 80, the type of the image is determined as the UI image. When differences between the number of pixels corresponding to all of the adjacent color gradation values are less than 80, or there are only 1, 2 or 3 groups of adjacent color gradation values, the difference between the number of pixels corresponding to each of which is larger than 80, the type of the image is determined as the nature image.

In the step 305, the nature image is determined to be the type, and the image is enhanced using a first saturation enhancement mode.

In some embodiments, the first saturation enhancement mode refers to transforming each pixel of the image from an original color format to a Hue Saturation Value ("HSV") format, increasing a value of the saturation component S of each pixel by a preset value A1, and then transforming each pixel of the enhanced image from the HSV format back to the original color format, thus enhancing the saturation of the image.

In the step 306, it is determined that the type of the image is the UI image, and the image is enhanced using a second saturation enhancement mode, or the saturation of the image is kept unchanged.

In some embodiments, the second saturation enhancement mode refers to transforming each pixel of the image from the original color format to the HSV format, increasing the value of the saturation component S of each pixel by a preset value A2, and then transforming each pixel of the enhanced image from the HSV format back to the original color format, thus enhancing the saturation of the image.

In some embodiments, the preset value A2 is less than the preset value A1, that is, an enhancement level of the saturation for the nature image is larger than an enhancement level of the saturation for the UI image.

It should be noted that the saturation enhancement modes are not limited in this embodiment, and the saturation enhancement modes above are explanatory explanations only.

In summary, with the method for enhancing saturation provided by the embodiment, by detecting whether the change trend of the number of pixels corresponding to adjacent color gradation values meets the sudden change feature, if the change trend does not meet the sudden change feature, identifying the image as the nature image, and enhancing the image with the first saturation enhancement mode, if the change trend meets the sudden change feature, identifying the image as the UI image, and enhancing the image with the second saturation enhancement mode or without enhancing, it avoids that beauty degree of the UI image may be reduced when each image frame in the terminal is enhanced by the same mode for enhancing saturation. Thus, for each image frame of the terminal, different modes for enhancing saturation are used for different types, images of each type may get a better saturation, thus improving display effect of the terminal as a whole.

With the method for enhancing saturation provided by the embodiment, by filtering the noise data in the pixel distribution corresponding relationship, the interference of the noises data to subsequent detection process is reduced, thus improving the accuracy of computing.

Figure 4:
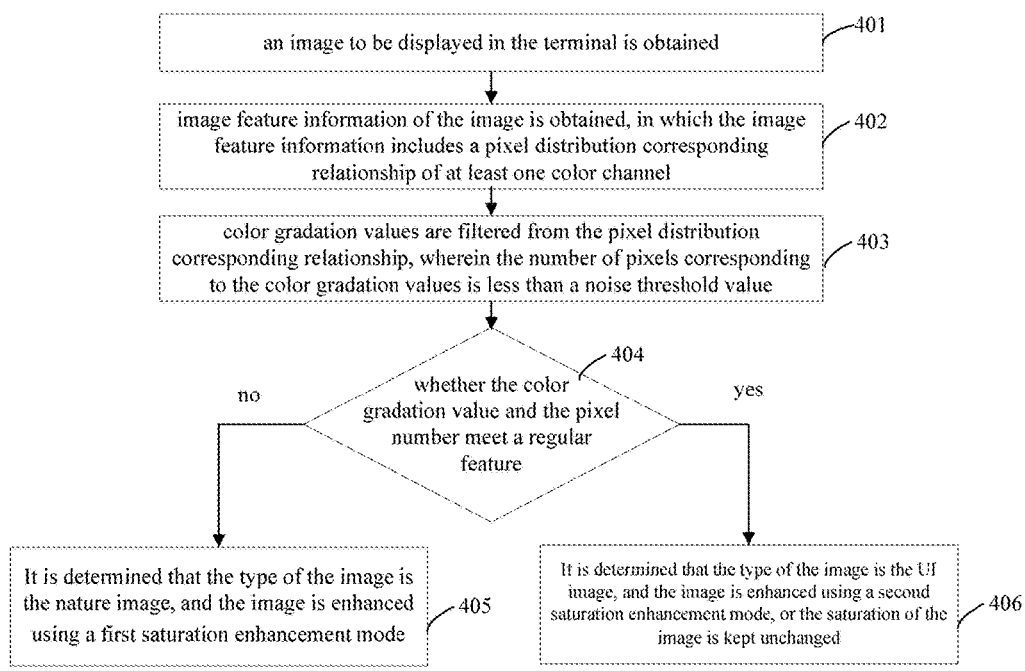
FIG. 4 is a flow chart showing a method for enhancing saturation according to another exemplary embodiment of the present disclosure.

FIG. 4 is a flow chart showing a method for enhancing saturation according to another exemplary embodiment of the present disclosure. It is exemplified that the method is applied to a terminal having image processing ability in this embodiment. The method includes followings.

In step 401, an image to be displayed in the terminal is obtained.

Images to be displayed are generated frame-by-frame during normal operation of the terminal. In some embodiments, the images are UI images generated by an operating system of the terminal, UI images generated by an application, nature images played by a video player, nature images generated by a game program, or photos taken by a camera program etc.

The terminal reads these images as images to be processed.

In step 402, image feature information of the image is obtained, in which the image feature information includes a pixel distribution corresponding relationship of at least one color channel.

In some embodiments, the pixel distribution corresponding relationship includes a corresponding relationship between a color gradation value and the number of pixels having the color gradation value, that is, the corresponding relationship shown in FIG. 2A to FIG. 2D.

When obtains the image data, the terminal obtains the pixel distribution corresponding relationship of at least one color channel as the image feature information of the image by computing the image data.

In some embodiments, the terminal computes a pixel distribution corresponding relationship of one color channel, the terminal computes pixel distribution corresponding relationships of two color channels, or, the terminal computes pixel distribution corresponding relationships of all color channels, which shall be determined by computing ability, computing speed, real-time requirements or other factors.

In step 403, color gradation values are filtered from the pixel distribution corresponding relationship, and the number of pixels corresponding to the color gradation values to be filed is less than a noise threshold value Since there are some color gradation values and the number of pixels corresponding to these color gradation values is very small, which belongs to meaningless noise, thus, the terminal filters these color gradation values. The "filter" refers to that these color gradation values are removed, or, when the number of pixels corresponding to a color gradation value is less than the noise threshold value, the number of pixels corresponding to the color gradation value may be set to 0.

In some embodiments, the noise threshold value is a numerical threshold, for example, the noise threshold value is 60. Alternatively, the noise threshold value is a proportional threshold, such as one in ten thousand of a total the number of pixels.

In step 404, it is detected whether the color gradation value and the pixel number meet a regular feature.

As the UI image is artificially designed, regular features may appear in some dimensions for the color gradation values, the number of pixels corresponding to some color gradation values, the corresponding relationships between color gradation values and the number of pixels corresponding to the color gradation values, or the color gradation values of some pixels in each color channel.

In some embodiments, the regular features of the UI image include but are not limited to at least one of the following features.

There are n3 groups of adjacent color gradation values, in which in each group of the n3 groups of the adjacent color gradation values, the ratio between the number of pixels respectively corresponding to the adjacent color gradation values is an integer multiple, and n3 is a positive integer. Taking FIG. 2B as an example, the number of pixels corresponding to the ith color gradation value is X, and the number of pixels corresponding to the (i+k)th adjacent color gradation value is X, then there are the plurality of groups of adjacent color gradation values, the ratio of the number of pixels corresponding to which is 1. Taking FIG. 2C as an example, the number of pixels corresponding to the ith color gradation value is Y, and the number of pixels corresponding to the (i+k)th adjacent color gradation value is 2Y, then there are the plurality of groups of adjacent color gradation values, the ratio of the number of pixels corresponding to which is 2.

Alternatively, there are n4 color gradation values, wherein in each of the n4 color gradation values, the number of pixels in each color channel is equal, and n4 is a positive integer. Taking FIG. 2B, FIG. 2C or FIG. 2D as an example, the corresponding the number of pixels in the red channel R, the green channel G and the blue channel B of each color gradation value are all the same.

Alternatively, there are n5 color gradation values, wherein in each of the n5 color gradation values, the ratio between the number of pixels in each color channel meets a preset proportion, in which the preset proportion is not equal to 1, and n5 is a positive integer. For example, there is a kind of UI image, including a first type of pixels with a color gradation value (255, 0, 0) and a second type of pixels with a color gradation value (0, 255, 0). The first type of pixels accounts for ⅓ of the total the number of pixels, and the second type of pixels accounts for ⅔ of the total the number of pixels. Supposing that for a color gradation value 0, the number of pixels in the red channel R is 200, the number of pixels in the green channel G is 100, and the number of pixels in the blue channel B is 200, then for the color gradation value 0, a proportion between the number of pixels in the red channel and the number of pixels in the green channel is 2, and a proportion between the number of pixels in the green channel and the number of pixels in the blue channel is ½.

Alternatively, there are $n_6$ pixels, in which each of the n6 pixels corresponds to a same color gradation value in each color channel, and n6 is a positive integer. For example, for a monochrome image or an image shown in FIG. 2D, there are more than 100 pixels that correspond to exactly the same color gradation value (a, b, c).

The terminal may detect whether the color gradation value and/or the pixel number meets the regular feature. Alternatively, the terminal detects all the color gradation values and/or all the number of pixels, or the terminal detects a part of the color gradation values and/or a part of the number of pixels.

If the color gradation value and the pixel number do not meet the regular feature, it is determined that the type of the image is the nature image, and the method proceeds to step 405. If the color gradation value and the pixel number meet the regular feature, it is determined that the type of the image is the UI image, and the method proceeds to step 406.

In the step 405, it is determined that the type of the image is the nature image, and the image is enhanced using a first saturation enhancement mode.

In some embodiments, the first saturation enhancement mode refers to transforming each pixel of the image from an original color format to a HSV format, increasing a value of the saturation component S of each pixel by a preset value A1, and then transforming each pixel of the enhanced image from the HSV format back to the original color format, thus enhancing the saturation of the image.

In the step 406, it is determined that the type of the image is the UI image, and the image is enhanced using a second saturation enhancement mode, or the saturation of the image is kept unchanged.

In some embodiments, the second saturation enhancement mode refers to transforming each pixel of the image from the original color format to the HSV format, increasing the value of the saturation component S of each pixel by a preset value A2, and then transforming each pixel of the enhanced image from the HSV format back to the original color format, thus enhancing the saturation of the image.

In some embodiments, the preset value A2 is less than the preset value A1, that is, an enhancement level of the saturation for the nature image is larger than an enhancement level of the saturation for the UI image.

It should be noted that the saturation enhancement modes are not limited in this embodiment, and the saturation enhancement modes above are explanatory explanations only.

In summary, with the method for enhancing saturation provided by the embodiment, by detecting whether at least one of the color gradation value and the pixel number meets the regular feature, if the at least one of the color gradation value and the pixel number does not meet the regular feature, identifying the image as the nature image, and enhancing the image with the first saturation enhancement mode, if the at least one of the color gradation value and the pixel number meets the regular feature, identifying the image as the UI image, and enhancing the image with the second saturation enhancement mode or without enhancing, it avoids that beauty degree of the UI image may be reduced when each image frame in the terminal is enhanced by the same mode for enhancing saturation. Thus, for each image frame of the terminal, different modes for enhancing saturation are used for different types, images of each type may get a better saturation, thus improving display effect of the terminal as a whole.

With the method for enhancing saturation provided by the embodiment, by filtering the noise data in the pixel distribution corresponding relationship, the interference of the noises data to subsequent detection process is reduced, thus improving the accuracy of computing.

Figure 5:
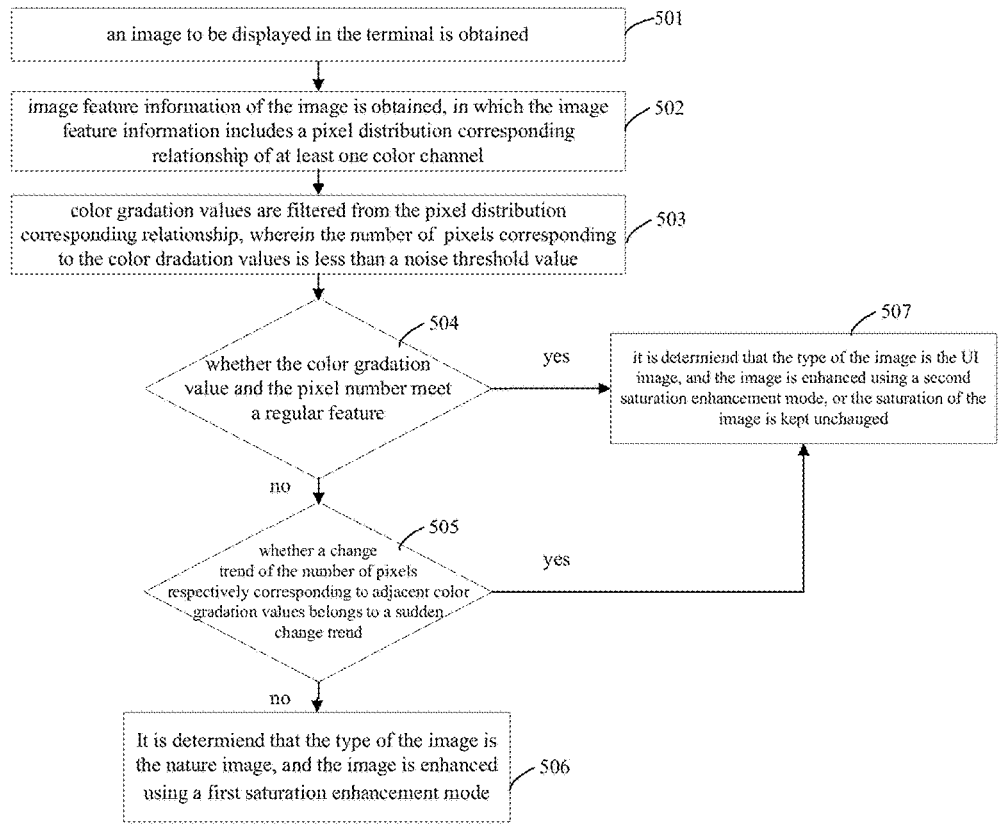
FIG. 5 is a flow chart showing a method for enhancing saturation according to another exemplary embodiment of the present disclosure.

Embodiments shown in FIG. 5 may be obtained by combining embodiments shown in FIG. 3 and embodiments shown in FIG. 4.

FIG. 5 is a flow chart showing a method for enhancing saturation according to another exemplary embodiment of the present disclosure. It is exemplified that the method is applied to a terminal having image processing ability in this embodiment. The method includes followings.

In step 501, an image to be displayed in the terminal is obtained.

In step 502, image feature information of the image is obtained, in which the image feature information includes a pixel distribution corresponding relationship of at least one color channel.

In step 503, color gradation values are filtered from the pixel distribution corresponding relationship, and the number of pixels corresponding to the color gradation values to be filed is less than a noise threshold value.

In step 504, it is detected whether the color gradation value and the pixel number meet a regular feature.

In some embodiments, the regular features of the UI image include but are not limited to at least one of the features, as detailed in the embodiments of FIG. 4.

If the color gradation value and the pixel number do not meet the regular feature, the method proceeds to step 505. If the color gradation value and the pixel number meet the regular feature, the method proceeds to step 507.

At step the 505, it is detected whether a change trend of the number of pixels corresponding to adjacent color gradation values belongs to a sudden change trend.

In some embodiments, the sudden change trend includes: there are $n_1$ groups of adjacent color gradation values, in which in each group of the n1 groups of adjacent color gradation values, the difference between the number of pixels respectively corresponding to the adjacent color gradation values is greater than a first threshold value, and n1 is a positive integer.

Alternatively, the sudden change trend includes: there are $n_2$ groups of adjacent color gradation values, in which in each of the n2 groups of adjacent color gradation values, the ratio between the number of pixels respectively corresponding to the adjacent color gradation values is greater than a second threshold value, and n2 is a positive integer.

If the change trend does not belong to the sudden change trend, the type of the image is a nature image, and the method proceeds to step 506. If the change trend belongs to the sudden change trend, the type of the image is a UI image, and the method proceeds to step 507.

At the step 506, it is determined that the type of the image is the nature image, and the image is enhanced using a first saturation enhancement mode.

In some embodiments, the first saturation enhancement mode refers to transforming each pixel of the image from an original color format to a HSV format, increasing a value of the saturation component S of each pixel by a preset value A1, and then transforming each pixel of the enhanced image from the HSV format back to the original color format, thus enhancing the saturation of the image.

At the step 507, it is determined that the type of the image is the UI image, and the image is enhanced using a second saturation enhancement mode, or the saturation of the image is kept unchanged.

In some embodiments, the second saturation enhancement mode refers to transforming each pixel of the image from the original color format to the HSV format, increasing the value of the saturation component S of each pixel by a preset value A2, and then transforming each pixel of the enhanced image from the HSV format back to the original color format, thus enhancing the saturation of the image.

In some embodiments, the preset value A2 is less than the preset value A1, that is, an enhancement level of the saturation for the nature image is larger than an enhancement level of the saturation for the UI image.

It should be noted that the saturation enhancement mode is not limited in this embodiment, and the saturation enhancement modes above are explanatory explanations only.

In summary, with the method for enhancing saturation provided by the embodiment, by double detection mechanisms of "the regular feature" and "the sudden change feature", the type of the image is identified very accurately, thus enhancing the nature image with the first saturation enhancement mode and enhancing the UI image with the second saturation enhancement mode or without enhancing. It avoids that beauty degree of the UI image may be reduced when each image frame in the terminal is enhanced by the same mode for enhancing saturation. Thus, for each image of the terminal, different modes for enhancing saturation are used for different types, images of each type may get a better saturation, thus improving display effect of the terminal as a whole.

With the method for enhancing saturation provided by the embodiment, by filtering the noise data in the pixel distribution corresponding relationship, the interference of the noises data to subsequent detection process is reduced, thus improving the accuracy of computing.

Followings are device embodiments of the present disclosure, which may be used to execute the method embodiments of the present disclosure. Please refer to the method embodiments of the present disclosure for detailed description that is not disclosed in the device embodiments of the present disclosure.

Figure 6:
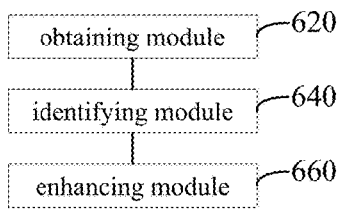
FIG. 6 is a schematic diagram illustrating a device for enhancing saturation according to an exemplary embodiment of the present disclosure.

FIG. 6 is a schematic diagram illustrating a device for enhancing saturation according to an exemplary embodiment of the present disclosure. The device for enhancing saturation may be realized as part or entire of a terminal having image processing ability by software, hardware or combinations thereof. The device includes an obtaining module 620, an identifying module 640 and an enhancing module 660.

The obtaining module 620 is configured to obtain image feature information of an image.

The identifying module 640 is configured to identify a type of the image according to the image feature information.

The enhancing module 660 is configured to select a saturation enhancement mode corresponding to the type of the image, and to enhance the saturation of the image using the saturation enhancement mode.

In some embodiments, the image feature information includes a pixel distribution corresponding relationship of at least one color channel, and the pixel distribution corresponding relationship includes a corresponding relationship between a color gradation value and the number of pixels having the color gradation value.

The identifying module 640 is configured to detect whether a change trend of the number of pixels respectively corresponding to adjacent color gradation values belongs to a sudden change trend; if the change trend does not belong to the sudden change trend, to determine that the type of the image is a nature image; if the change trend belongs to the sudden change trend, to determine that the type of the image is a user interface image.

The adjacent color gradation values are two color gradation values having a difference less than a preset value.

In some embodiments, the sudden change trend includes: there are $n_1$ groups of adjacent color gradation values, wherein in each group of the n1 groups of adjacent color gradation values, the difference between the number of pixels respectively corresponding to the adjacent color gradation values is greater than a first threshold value, and n1 is a positive integer.

Alternatively, the sudden change trend includes: there are $n_2$ groups of adjacent color gradation values, in which in each of the n2 groups of adjacent color gradation values, the ratio between the number of pixels respectively corresponding to the adjacent color gradation values is greater than a second threshold value, and n2 is a positive integer.

In some embodiments, the image feature information includes a pixel distribution corresponding relationship of at least one color channel, and the pixel distribution corresponding relationship includes a corresponding relationship between a color gradation value and the number of pixels having the color gradation value.

The identifying module 640 is configured to detect whether the color gradation value and the pixel number meet a regular feature; if the color gradation value and the pixel number meet the regular feature, to determine that the type of the image is a user interface image; if the color gradation value and the pixel number do not meet the regular feature, to determine that the type of the image is a nature image.

In some embodiments, the regular feature is detailed with referenced to the embodiments of FIG. 4.

In some embodiments, the device further includes a filtering module, configured to filter color gradation values from the pixel distribution corresponding relationship, and the number of pixels corresponding to the filter color gradation values to be filed is less than a noise threshold value In some embodiments, the enhancing module 660 is configured to enhance the image with a first saturation enhancement mode, if the type of the image is the nature image; to enhance the image with a second saturation enhancement mode, or to keep the saturation of the image unchanged, if the type of the image is the user interface image.

An enhancement level of the second saturation enhancement mode is lower than an enhancement level of the first saturation enhancement mode.

In summary, with the device for enhancing saturation provided by the embodiment, by double detection mechanisms of "the regular feature" and "the sudden change feature", the type of the image is identified very accurately, thus enhancing the nature image with the first saturation enhancement mode and enhancing the UI image with the second saturation enhancement mode or without enhancing. It avoids that beauty degree of the UI image may be reduced when each image frame in the terminal is enhanced by the same mode for saturation enhancing. Thus, for each image of the terminal, different modes for saturation enhancing are used for different types, images of each type may get a better saturation, thus improving display effect of the terminal as a whole.

With the device for enhancing saturation provided by the embodiment, by filtering the noise data in the pixel distribution corresponding relationship, the interference of the noises data to subsequent detection process is reduced, thus improving the accuracy of computing.

With respect to the device in the above embodiments, specific manners for respective modules performing operations have been described in detail in the related method embodiments and detailed descriptions thereof are omitted herein.

A device for enhancing saturation is provided by an exemplary embodiment of the present disclosure, which may realize the method for enhancing saturation provided by the present disclosure. The device for enhancing saturation includes a processor and a memory for storing instructions executable by the processor, in which the processor is configured to: obtain image feature information of an image; identify a type of the image according to the image feature information; select a saturation enhancement mode corresponding to the type of the image, and enhance the saturation of the image using the saturation enhancement mode.

Figure 7:
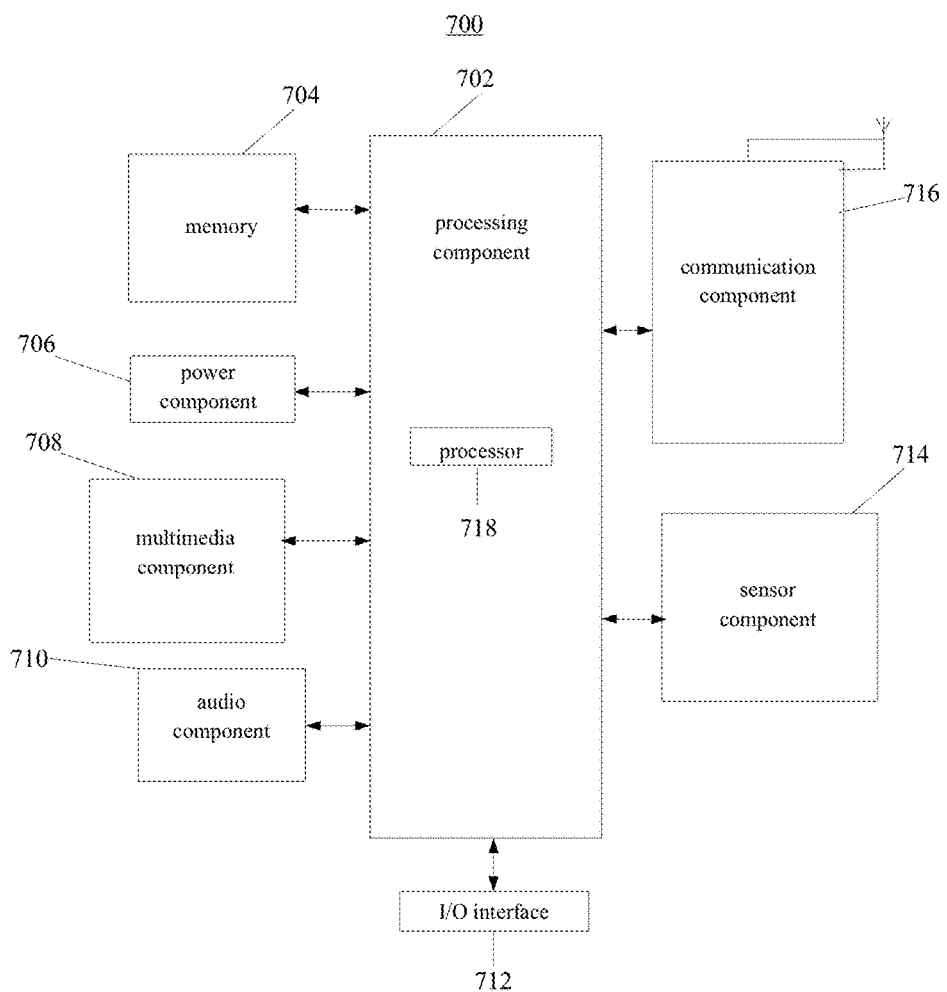
FIG. 7 is a schematic diagram illustrating a device for enhancing saturation according to another exemplary embodiment of the present disclosure.

FIG. 7 is a schematic diagram illustrating a device for enhancing saturation according to an exemplary embodiment of the present disclosure. For example, the device 700 may be a mobile phone, a computer, a digital broadcasting terminal, a messaging device, a game console, a tablet device, a medical device, fitness equipment, a Personal Digital Assistant PDA, and the like.

Referring to FIG. 7, the device 700 may include the following one or more components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 718 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user, and the four corner of the screen are rounded. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 708 includes a front camera and/or a rear camera. The front camera and/or the rear camera may receive external multimedia data while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface for the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700 and relative positioning of components (e.g. the display and the keypad of the device 700. The sensor component 714 may also detect a change in position of the device 700 or of a component in the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate wired or wireless communication between the device 700 and other devices. The device 700 can access a wireless network based on a communication standard, such as WIFI, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 704 including instructions. The instructions may be performed by the processor 718 of the device 700 so as to realize the method for generating information. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for enhancing saturation, the method comprising:
obtaining image feature information of an image, wherein the image feature information comprises a pixel distribution corresponding relationship of at least one color channel, and the pixel distribution corresponding relationship comprises a corresponding relationship between a color gradation value and the number of pixels having the color gradation value;
identifying a type of the image according to the image feature information, wherein identifying a type of the image according to the image feature information comprises: detecting whether a change trend of the number of pixels respectively corresponding to adjacent color gradation values belongs to a sudden change trend, wherein the adjacent color gradation values are two color gradation values having a difference less than a preset value; determining that the type of the image is a nature image if the change trend does not belong to the sudden change trend; and determining that the type of the image is a user interface image if the change trend belongs to the sudden change trend; and
selecting a saturation enhancement mode corresponding to the type of the image, and enhancing the saturation of the image using the saturation enhancement mode;
wherein detecting whether a change trend of the number of pixels respectively corresponding to adjacent color gradation values belongs to a sudden change trend comprises: detecting whether there are $n_1$ groups of the adjacent color gradation values, wherein in each group of the $n_1$ groups of adjacent color gradation values, the difference between the number of pixels respectively corresponding to the adjacent color gradation values is greater than a first threshold value, and $n_1$ is a positive integer.

2. The method according to claim 1, wherein detecting whether a change trend of the number of pixels respectively corresponding to adjacent color gradation values belongs to a sudden change trend comprises:
detecting whether there are $n_2$ groups of the adjacent color gradation values, wherein in each of the $n_2$ groups of adjacent color gradation values, the ratio between the number of pixels respectively corresponding to the adjacent color gradation values is greater than a second threshold value, and $n_2$ is a positive integer.

3. The method according to claim 1,
wherein identifying a type of the image according to the image feature information comprises:
detecting whether the color gradation value and the pixel number meets a regular feature;
determining that the type of the image is a user interface image if the color gradation value and the pixel number meets the regular feature; and
determining that the type of the image is a nature image if the color gradation value and the pixel number do not meet the regular feature.

4. The method according to claim 3, wherein detecting whether the color gradation value and the pixel number meet the regular feature comprises any one of:
detecting whether there are $n_3$ groups of the adjacent color gradation values, wherein in each group of the $n_3$ groups of the adjacent color gradation values, the ratio between the number of pixels respectively corresponding to the adjacent color gradation values is an integer multiple, and $n_3$ is a positive integer;
detecting whether there are $n_4$ color gradation values, wherein in each of the $n_4$ color gradation values, the number of pixels in each color channel is equal, and $n_4$ is a positive integer;
detecting whether there are $n_5$ color gradation values, wherein in each of the $n_5$ color gradation values, the ratio between the number of pixels in each color channel meets a preset proportion, in which the preset proportion is not equal to 1, and $n_5$ is a positive integer;
detecting whether there are $n_6$ pixels, wherein each of the $n_6$ pixels corresponds to a same color gradation value in each color channel, and $n_6$ is a positive integer.

5. The method according to claim 1, further comprising:
filtering color gradation values from the pixel distribution corresponding relationship, wherein the number of pixels corresponding to the color gradation values is less than a noise threshold value.

6. The method according to claim 1, wherein selecting a saturation enhancement mode corresponding to the type of the image and enhancing the saturation of the image using the saturation enhancement mode comprises:
  enhancing the image using a first saturation enhancement mode if the type of the image is a nature image;
  enhancing the image using a second saturation enhancement mode if the type of the image is a user interface image, wherein an enhancement level of the second saturation enhancement mode is lower than an enhancement level of the first saturation enhancement mode.

7. A device for enhancing saturation, the device comprising:
  a processor;
  a memory for storing instructions executable by the processor;
  wherein the processor is configured to:
    obtain image feature information of an image, wherein the image feature information comprises a pixel distribution corresponding relationship of at least one color channel, and the pixel distribution corresponding relationship comprises a corresponding relationship between a color gradation value and the number of pixels having the color gradation value;
    identify a type of the image according to the image feature information, wherein the processor is configured to identify a type of the image according to the image feature information by acts of: detecting whether a change trend of the number of pixels respectively corresponding to adjacent color gradation values belongs to a sudden change trend, wherein the adjacent color gradation values are two color gradation values having a difference less than a preset value; determining that the type of the image is a nature image if the change trend does not belong to the sudden change trend; and determining that the type of the image is a user interface image if the change trend belongs to the sudden change trend; and
    select a saturation enhancement mode corresponding to the type of the image, and enhance the saturation of the image using the saturation enhancement mode,
  wherein detecting whether a change trend of the number of pixels respectively corresponding to adjacent color gradation values belongs to a sudden change trend comprises: detecting whether there are $n_1$ groups of the adjacent color gradation values, wherein in each group of the $n_1$ groups of adjacent color gradation values, the difference between the number of pixels respectively corresponding to the adjacent color gradation values is greater than a first threshold value, and $n_1$ is a positive integer.

8. The device according to claim 7, wherein detecting whether a change trend of the number of pixels respectively corresponding to adjacent color gradation values belongs to a sudden change trend comprises:
  detecting whether there are $n_2$ groups of the adjacent color gradation values, wherein in each of the $n_2$ groups of adjacent color gradation values, the ratio between the number of pixels respectively corresponding to the adjacent color gradation values is greater than a second threshold value, and $n_2$ is a positive integer.

9. The device according to claim 7,
  wherein the processor is configured to identify a type of the image according to the image feature information by acts of:
  detecting whether the color gradation value and the pixel number meet a regular feature;
  determining that the type of the image is a user interface image if the color gradation value and the pixel number meet the regular feature;
  determining that the type of the image is a nature image if the color gradation value and the pixel number does not meet the regular feature.

10. The device according to claim 9, wherein detecting whether the color gradation value and the pixel number meet the regular feature comprises any one of:
  detecting whether there are $n_3$ groups of the adjacent color gradation values, wherein in each group of the $n_3$ groups of the adjacent color gradation values, the ratio between the number of pixels respectively corresponding to the adjacent color gradation values is an integer multiple, and $n_3$ is a positive integer;
  detecting whether there are $n_4$ color gradation values, wherein in each of the $n_4$ color gradation values, the number of pixels in each color channel is equal, and $n_4$ is a positive integer;
  detecting whether there are $n_5$ color gradation values, wherein in each of the $n_5$ color gradation values, the ratio between the number of pixels in each color channel meets a preset proportion, in which the preset proportion is not equal to 1, and $n_5$ is a positive integer;
  detecting whether there are $n_6$ pixels, wherein each of the $n_6$ pixels corresponds to a same color gradation value in each color channel, and $n_6$ is a positive integer.

11. The device according to claim 7, wherein the processor is further configured to:
  filter color gradation values from the pixel distribution corresponding relationship, wherein the number of pixels corresponding to the color gradation values is less than a noise threshold value.

12. The device according to claim 7, wherein the processor is configured to select a saturation enhancement mode corresponding to the type of the image and to enhance the saturation of the image using the saturation enhancement mode by acts of:
  enhancing the image with a first saturation enhancement mode if the type of the image is a nature image;
  enhancing the image with a second saturation enhancement mode if the type of the image is a user interface image, wherein an enhancement level of the second saturation enhancement mode is lower than an enhancement level of the first saturation enhancement mode.

13. A non-transitory computer-readable storage medium having stored therein instructions that, when executed by a processor of a device, causes the device to perform a method for enhancing saturation, the method comprising:
  obtaining image feature information of an image, wherein the image feature information comprises a pixel distribution corresponding relationship of at least one color channel, and the pixel distribution corresponding relationship comprises a corresponding relationship between a color gradation value and the number of pixels having the color gradation value;
  identifying a type of the image according to the image feature information, wherein identifying a type of the image according to the image feature information comprises: detecting whether a change trend of the number of pixels respectively corresponding to adjacent color gradation values belongs to a sudden change trend, wherein the adjacent color gradation values are two color gradation values having a difference less than a preset value; determining that the type of the image is a nature image if the change trend does not belong to the sudden change trend; and determining that the type of the image is a user interface image if the change trend belongs to the sudden change trend; and selecting a saturation enhancement mode corresponding to the type of the image, and enhancing the saturation of the image using the saturation enhancement mode, wherein detecting whether a change trend of the number of pixels respectively corresponding to adjacent color gradation values belongs to a sudden change trend comprises: detecting whether there are $n_1$ groups of the adjacent color gradation values, wherein in each group of the $n_1$ groups of adjacent color gradation values, the difference between the number of pixels respectively corresponding to the adjacent color gradation values is greater than a first threshold value, and $n_1$ is a positive integer.

14. The non-transitory computer-readable storage medium according to claim 13, wherein detecting whether a change trend of the number of pixels respectively corresponding to adjacent color gradation values belongs to a sudden change trend comprises:

detecting whether there are $n_2$ groups of the adjacent color gradation values, wherein in each of the $n_2$ groups of adjacent color gradation values, the ratio between the number of pixels respectively corresponding to the adjacent color gradation values is greater than a second threshold value, and $n_2$ is a positive integer.

15. The non-transitory computer-readable storage medium according to claim 13, wherein identifying a type of the image according to the image feature information comprises:

detecting whether the color gradation value and the pixel number meets a regular feature;

determining that the type of the image is a user interface image if the color gradation value and the pixel number meets the regular feature; and determining that the type of the image is a nature image if the color gradation value and the pixel number do not meet the regular feature.

16. The non-transitory computer-readable storage medium according to claim 15, wherein detecting whether the color gradation value and the pixel number meet the regular feature comprises any one of:

detecting whether there are $n_3$ groups of the adjacent color gradation values, wherein in each group of the $n_3$ groups of the adjacent color gradation values, the ratio between the number of pixels respectively corresponding to the adjacent color gradation values is an integer multiple, and $n_3$ is a positive integer;

detecting whether there are $n_4$ color gradation values, wherein in each of the $n_4$ color gradation values, the number of pixels in each color channel is equal, and $n_4$ is a positive integer;

detecting whether there are $n_5$ color gradation values, wherein in each of the $n_5$ color gradation values, the ratio between the number of pixels in each color channel meets a preset proportion, in which the preset proportion is not equal to 1, and $n_5$ is a positive integer;

detecting whether there are $n_6$ pixels, wherein each of the $n_6$ pixels corresponds to a same color gradation value in each color channel, and $n_6$ is a positive integer.

17. The non-transitory computer-readable storage medium according to claim 13, wherein the method further comprises:

filtering color gradation values from the pixel distribution corresponding relationship, wherein the number of pixels corresponding to the color gradation values is less than a noise threshold value.

18. The non-transitory computer-readable storage medium according to claim 13, wherein selecting a saturation enhancement mode corresponding to the type of the image and enhancing the saturation of the image using the saturation enhancement mode comprises:

enhancing the image using a first saturation enhancement mode if the type of the image is a nature image;

enhancing the image using a second saturation enhancement mode if the type of the image is a user interface image, wherein an enhancement level of the second saturation enhancement mode is lower than an enhancement level of the first saturation enhancement mode.

* * * * *